(12) United States Patent
Lam

(10) Patent No.: US 7,620,220 B2
(45) Date of Patent: Nov. 17, 2009

(54) SCAN CONVERSION OF MEDICAL IMAGING DATA FROM POLAR FORMAT TO CARTESIAN FORMAT

(75) Inventor: Duc Huu Lam, San Jose, CA (US)

(73) Assignee: Boston Scientific Scimed, Inc., Maple Grove, MN (US)

( * ) Notice: Subject to any disclaimer, the term of this patent is extended or adjusted under 35 U.S.C. 154(b) by 1253 days.

(21) Appl. No.: 10/394,480

(22) Filed: Mar. 21, 2003

(65) Prior Publication Data

US 2004/0186369 A1 Sep. 23, 2004

(51) Int. Cl.
*G06K 9/00* (2006.01)

(52) U.S. Cl. ....................................................... 382/128

(58) Field of Classification Search ................. 382/100, 382/128, 131, 132, 133, 134, 276, 277, 285, 382/286, 293, 298, 325, 154; 345/419, 420, 345/427, 581, 582, 583, 585, 586, 619, 646, 345/647, 660, 661, 664, 665; 348/61, 65, 348/77, 441, 442

See application file for complete search history.

(56) References Cited

U.S. PATENT DOCUMENTS

| | | | | |
|---|---|---|---|---|
| 4,915,663 A | * | 4/1990 | Magers | 446/219 |
| 5,255,352 A | * | 10/1993 | Falk | 345/582 |
| 5,276,798 A | * | 1/1994 | Peaslee et al. | 345/505 |
| 5,321,501 A | | 6/1994 | Swanson et al. | 356/345 |
| 5,396,890 A | * | 3/1995 | Weng | 600/443 |
| 5,400,785 A | | 3/1995 | Crowley | 128/662.06 |
| 5,421,338 A | * | 6/1995 | Crowley et al. | 600/463 |
| 5,448,687 A | * | 9/1995 | Hoogerhyde et al. | 345/423 |
| 5,459,570 A | | 10/1995 | Swanson et al. | 356/345 |
| 5,460,178 A | | 10/1995 | Hudon et al. | 128/660.07 |
| 5,533,628 A | * | 7/1996 | Tao | 209/580 |
| 5,680,525 A | * | 10/1997 | Sakai et al. | 345/585 |
| 5,760,826 A | | 6/1998 | Nayar | 348/36 |
| 5,928,145 A | | 7/1999 | Ocali et al. | 600/410 |
| 6,046,695 A | * | 4/2000 | Poehler et al. | 342/25 A |
| 6,063,032 A | | 5/2000 | Grunwald | 600/440 |
| 6,135,960 A | | 10/2000 | Holmberg | 600/447 |
| 6,167,296 A | * | 12/2000 | Shahidi | 600/427 |
| 6,248,073 B1 | | 6/2001 | Gilbert et al. | 600/447 |
| 6,379,304 B1 | | 4/2002 | Gilbert et al. | 600/447 |
| 6,384,915 B1 | | 5/2002 | Everett et al. | 356/336 |

(Continued)

OTHER PUBLICATIONS

Tearney, G. J., et. al, "Scanning Single-Mode Fiber Optic Catheter-Endoscope for Optical Coherence Tomograph," (1996), Optics Letters 21 (7): 543-545.*

(Continued)

*Primary Examiner*—Samir A. Ahmed
*Assistant Examiner*—Atiba O Fitzpatrick
(74) *Attorney, Agent, or Firm*—Darby & Darby P.C.; Patrick R. Turner (57) ABSTRACT

The improved system and method converts medical imaging data in R-θ or polar format to a Cartesian format that is readily recognizable to the human eye. The system and method texturize or wrap the R-θ imaging data around an object, which is preferably a cone. The height of the cone is zero, or reduced to zero, to create the Cartesian format. To texturize or wrap the R-θ imaging data around the cone, the preferred embodiment uses a commercially available graphics processing unit and software.

20 Claims, 9 Drawing Sheets

U.S. PATENT DOCUMENTS

| | | | |
|---|---|---|---|
| 6,426,756 B1 * | 7/2002 | Winget et al. | 345/582 |
| 6,545,678 B1 * | 4/2003 | Ohazama | 345/427 |
| 6,626,834 B2 * | 9/2003 | Dunne et al. | 600/444 |
| 6,774,818 B1 * | 8/2004 | Alfredsson et al. | 340/971 |
| 6,906,723 B2 * | 6/2005 | Ault, Jr. | 345/582 |
| 7,062,722 B1 * | 6/2006 | Carlin et al. | 715/850 |
| 7,123,777 B2 * | 10/2006 | Rondinelli et al. | 382/284 |
| 7,127,092 B2 * | 10/2006 | Jack et al. | 382/128 |
| 7,171,030 B2 * | 1/2007 | Foran et al. | 382/128 |
| 7,259,760 B1 * | 8/2007 | Hashimoto et al. | 345/419 |
| 7,272,252 B2 * | 9/2007 | De La Torre-Bueno et al. | 382/133 |
| 7,274,365 B1 * | 9/2007 | Dunn | 345/426 |
| 2002/0049375 A1 * | 4/2002 | Strommer et al. | 600/407 |
| 2005/0128211 A1 * | 6/2005 | Berger et al. | 345/582 |
| 2005/0187432 A1 * | 8/2005 | Hale et al. | 600/117 |
| 2007/0184274 A1 * | 8/2007 | Wheatley et al. | 428/411.1 |
| 2007/0216909 A1 * | 9/2007 | Everett et al. | 356/479 |

OTHER PUBLICATIONS

Nvidia, GeForce 2 Ultra Features and Benefits, rinted from nvidia.com website, Jun. 17, 2002.

* cited by examiner

SCAN CONVERSION OF MEDICAL IMAGING DATA FROM POLAR FORMAT TO CARTESIAN FORMAT

BACKGROUND OF THE INVENTION

1. Field of the Invention

The field of the invention is a system for and method of converting imaging or scanned data from a medical imaging device, and more particularly, is a system for and method of converting imaging or scanned data from a medical imaging device from a polar format to a Cartesian format.

2. Background

In diagnosing and treating patients, physicians and surgeons are often limited by what they can actually see in the patient. Medical imaging instruments have provided doctors with visualization of a patient's internal structures without the need for major invasive surgery to gain access to those internal structures. Such medical imaging instruments, for example, may be inserted into a patient's body through a natural orifice or a small laparoscopic incision. These medical imaging instruments typically use rotating imager or circular array of imagers in order to provide a three-dimensional view. The medical imaging instrument can use any form of energy to image the area including, for example, acoustic, light, magnetic, thermal, and x-ray energy.

An example of an acoustic medical imaging instrument is a catheter with an ultrasound transducer, is well known in the art; see, e.g., U.S. Pat. No. 5,400,785, entitled "Acoustic Window and Septum for Imaging Catheters", which is assigned to Boston Scientific Corporation, the entirety of which patent is incorporated herein by reference for all purposes.

An example of a light energy based medical imaging instrument is one using optical coherence tomography (OCT), which is well known in the art; see, e.g., U.S. Pat. No. 5,459,570, entitled "Method and Apparatus for Performing Optical Measurements," assigned to Massachusetts Institute of Technology; U.S. Pat. No. 5,321,501, entitled "Method and Apparatus for Optical Imaging with Means for Controlling the Longitudinal Range of the Sample," assigned to Massachusetts Institute of Technology; U.S. Pat. No. 6,384,915, entitled "Catheter Guided by Optical Coherence Domain Reflectometry", and assigned to the Regents of the University of California, the entirety of each of which are incorporated herein by reference for all purposes. OCT is an optical imaging technique, which achieves non-invasive, cross-sectional imaging of a patient's body. OCT is analogous to ultrasound imaging, but measures the intensity of back-scattered infrared light rather than acoustic waves. To image the blood vessel of a patient using OCT, an optical catheter is inserted into the blood vessel. An optical signal is transmitted through an optical fiber in the optical catheter and emitted at the distal end of the catheter into the blood vessel. The optical signal is typically produced by a laser, e.g., laser diode. The optical signal reflected back to the catheter from the blood vessel and surrounding tissue is transmitted through the optical fiber to an interferometer, which optically processes the reflected optical signal to obtain a depth image of the blood vessel. The optical signals produced by the light source, e.g., a laser, into the catheter optical fiber to be emitted inside the body. The OCT connection system then couples the reflected optical signal out of the catheter optical fiber to an interferometer to obtain a image of the inside of the body. In addition, the OCT connection system may include a motor unit for providing drive torque to the catheter optical fiber to rotate the catheter optical fiber during imaging. This enables a radial cross-sectional image of the inside of the body to be obtained. See also, Tearney, G. J., et. al, "Scanning Single-Mode Fiber Optic Catheter-Endoscope for Optical Coherence Tomograph," Optics Letters 21 (7): 543-545 (1996), the entirety of which is incorporated herein by reference for all purposes.

Optical coherence domain reflectometry (OCDR) has also been used for medical imaging. Likewise, other optical imaging approaches include optical time domain reflectometry (OCTR), scanning laser microscopes, scanning confocal microscopes, scanning laser ophthalmoscopes and optical triangulation. See, e.g., Youngquist R. C., et al. in "Optical Coherence-Domain Reflectometry: A New Optical Evaluation Technique," Optic Letters 12(3):158-160 (1987); Danielson, B. L., et. al, "Guided-Wave Reflectometry with Micrometer Resolution", Applied Physics 26(14): 2836-2842 (1987). The entirety of each of these references are incorporated herein by reference for all purposes.

An example of a magnetic medical imaging instrument is a magnetic resonance imaging device (MRI), which is well known in the art; see, e.g., U.S. Pat. No. 5,928,145, entitled "Method of Magnetic Resonance Imaging and Spectroscopic Analysis and Associated Apparatus Employing a Loopless Antenna", assigned to the Johns Hopkins University. X-ray medical imaging instruments are well known in the art. The entirety of each of these patents are incorporated herein by reference for all purposes.

Figure 1:
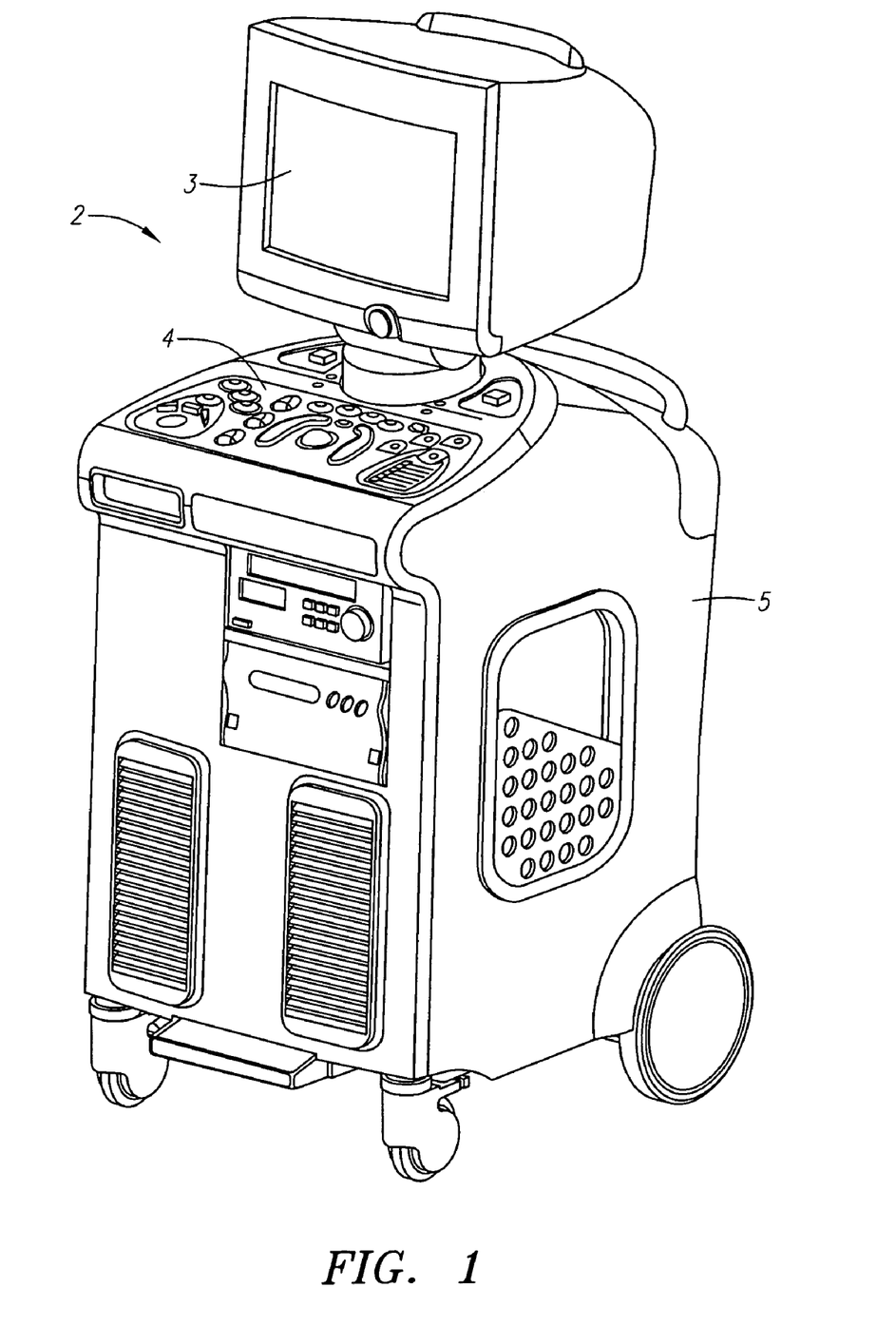
FIG. 1 is a representation of an example prior art medical image processing system.

The rotating imager takes snapshots of the patient's internal structures, which snapshots are often in a polar format. In other words, the rotating imager takes a series of images at different radii, rotates to a new position and takes another series of images at various radii, and repeats the process. Thus, in a polar format, the axes of the image are the angle theta $\theta$ at which the rotating imager has rotated from the initial starting position and the radius along that angle. The human brain has difficulty viewing, recognizing and comprehending polar images because humans are used to Cartesian formats, that is, where the axes are spatially oriented in two or three dimensions. As a result, polar images must be converted to Cartesian format so that doctors and health care professionals can understand the images for diagnostic purposes. However, the prior art systems and methods for converting polar images have been very complex and expensive, as well as requiring significant custom hardware. An example of a prior art medical image processing system 2 is shown in FIG. 1, having a monitor 3, keyboard 4 and body 5. The size of the body 5 of the system in FIG. 1 indicates the amount of hardware needed to process and convert the images.

Therefore, there is a need for a simpler, cheaper system and method for converting polar imaging data from a medical imaging device to a Cartesian format.

SUMMARY OF THE INVENTION

The improved system for and method of converting imaging or scanned data from a medical imaging device, which is in a radius R-angle $\theta$ or polar format, around a cone whose height is, or is later reduced to, zero or near-zero in order to create a Cartesian view of the imaging data. The medical imaging device may be based on, for example, acoustic, light, magnetic, or x-ray energy.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. Moreover, in the figures, like reference numerals designate corresponding parts throughout the different views. However, like parts do not always have like reference numerals. Moreover, all illustrations are intended to convey concepts, where relative sizes, shapes and other detailed attributes may be illustrated schematically rather than literally or precisely.

DETAILED DESCRIPTION OF THE PREFERRED EMBODIMENTS

Figure 2:
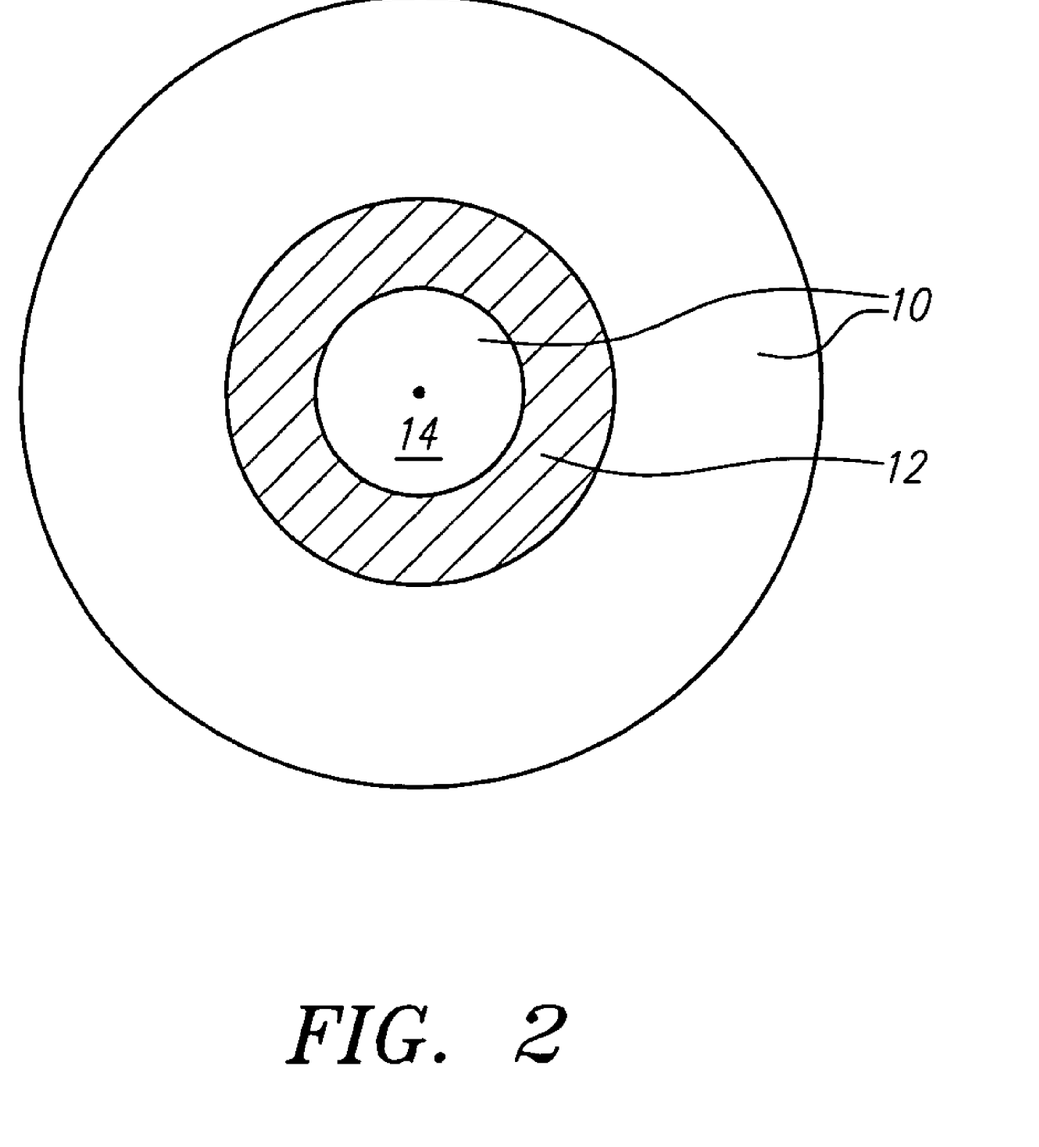
FIG. 2 is a representation of an example view of a blood vessel and stent from the human eye's perspective.

FIG. 2 is a representation of an example view of a blood vessel 10 and stent 12 from the human eye's perspective looking from the distal end of a medical imaging instrument or device. Of course, the view need not be of a blood vessel, as the medical imaging instrument (not shown) may image any part of the body. If a blood vessel 10 is imaged, the view need not include a stent 12, or other objects and characteristics may be present instead. The medical imaging instrument may include or be a catheter, endoscope, laparoscopic device, arthroscopic device, angioplasty device, surgical device, or other medical diagnostic and/or treatment device. The medical imaging instrument preferably has a rotating imager or rotating circular array of imagers and may use any form of energy to image the area including but not limited to acoustic, light, magnetic, thermal, and x-ray energy. For example, a rotating imager may comprise a rotating transducer or fiber optic; a rotating circular array of imagers may include a rotating array of transducers or fiber optics. The medical imaging instrument may be coupled to other components of a medical imaging system so that the medical imaging instrument sends imaging data to the rest of the medical imaging system for manipulation, display and other processing.

Additionally, the medical imaging instrument and medical imaging system may include any feature known to those of skill in the art of medical imaging devices. For example, the medical imaging instrument may include a balloon for angioplasty and/or other treatment purposes, a cutting device, an ablation device, a drug delivery system, a guidewire, one or more lumens, and/or other known features. As another example, certain elements of the medical imaging instrument, such as transducers and optical fibers, can be arranged in the various forms known in the art. The improved system and method described in this disclosure is not limited to a specific medical imaging instrument and may work with a variety of medical imaging instruments having a variety of features and functions.

Figure 3:
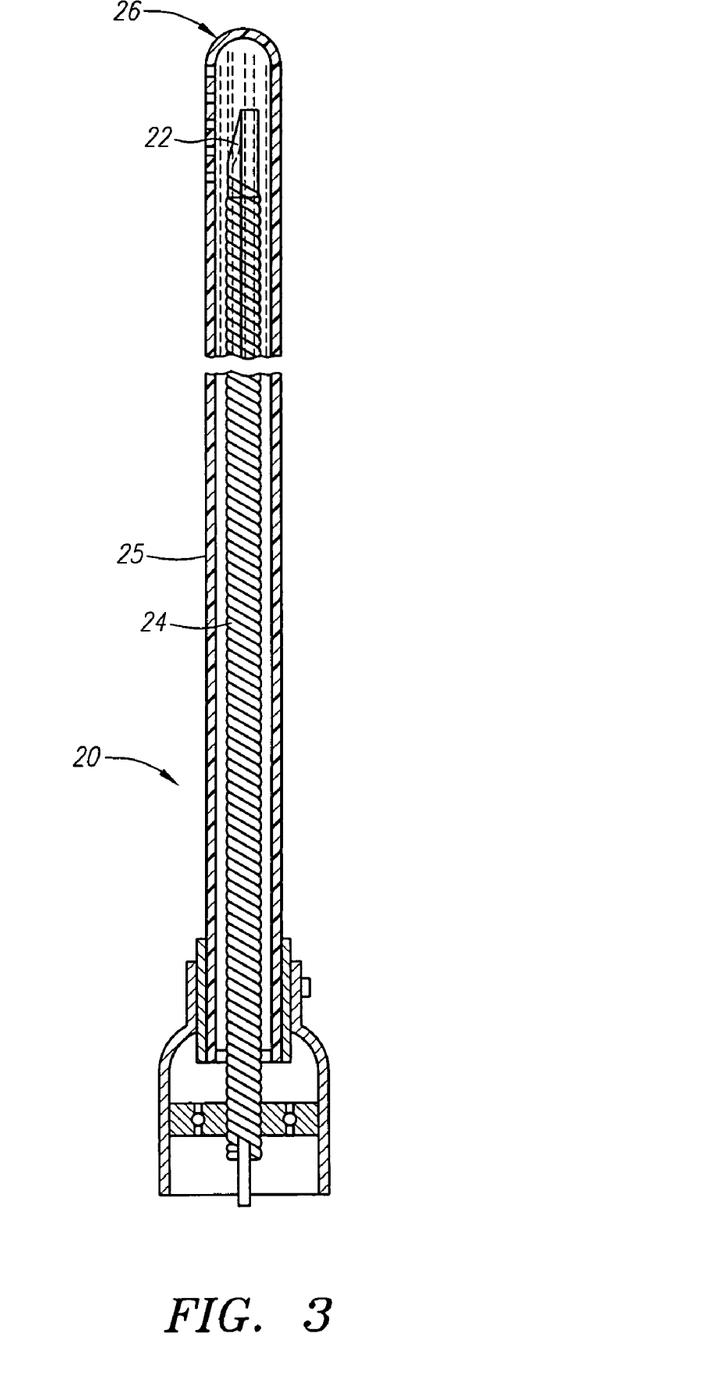
FIG. 3 is an example of an acoustic medical imaging instrument.

FIG. 3 is an example of an acoustic imaging instrument 20. The example acoustic imaging instrument 20 has a rotating acoustic imager 22, which is preferably an ultrasound transducer 22 mounted onto a drive shaft 24. In this example, the rotating imager 22 is within a catheter body 25 near the distal tip 26 of the catheter body 25. By rotating the drive shaft 24, the transducer 22 rotates. The transducer emits acoustic energy to the body tissue and/or objects to be imaged (e.g., a blood vessel, stent, etc.). The reflected acoustic energy in the form of waves is received by the transducer 22 to create data representing the image.

Figure 4:
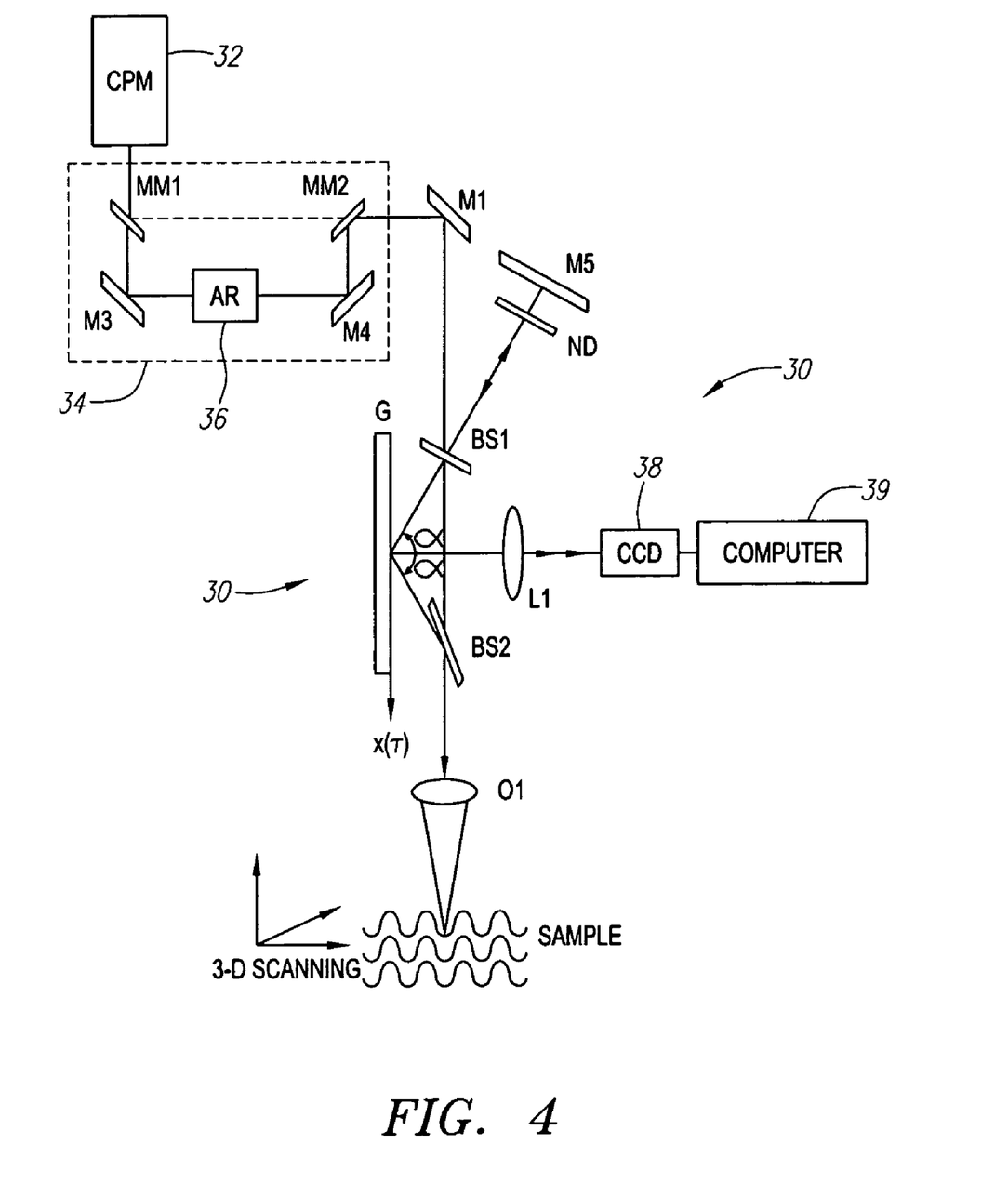
FIG. 4 is an example of a light-based medical imaging instrument.

FIG. 4 is an example of a light-based medical imaging system 30. In system 30, light from a colliding-pulse modelocked laser 32, is amplified in an amplifier apparatus 34, reflected off a first mirror M1 and strikes a first beamsplitter BS1 where it is split into a transmitted part which serves as a signal beam and reflected part which serves as a reference beam. Amplifier apparatus comprises a pair of movable mirrors MM1 and MM2, a pair of fixed mirrors M3 and M4 and an amplifier system 36. The reference beam passes through a neutral density filter ND and strikes a reference mirror M5. Light pulses from reference mirror M5 pass back through neutral density filter ND, through first beamsplitter BS1 and are incident on a reflection diffraction grating G. Grating G is oriented so as to have vertically disposed grooves. The signal beam transmitted through first beamsplitter BS1, passes through a second beamsplitter BS2 and is brought to focus by a spherical lens O1 on a sample S. Components of the system 30 may be rotatable or movable, if desired, to take polar images of sample S. Light pulses reflected from sample S are reflected off second beamsplitter BS2 and are incident on grating G. The reflections from sample S and mirror M5 are incident on the grating with respect to grating normal so that a positive diffraction orders from the reflections from one of the sample S and mirror M5 and a negative diffraction order from the reflections from the other one of the sample S and Mirror M5 propagate along the normal (p sin α=λ, where p is the spacing between grooves, $\frac{1}{1200}$ mm). The diffraction order from the reflections from sample S can either be a first order or a second order or a higher order. Similarly, the diffraction order from the reflections from mirror M5 is the same order (i.e. number) as the diffraction order of reflections from sample S. As an example, the diffracted light from the reference beam propagating along the normal to the diffraction grating is the negative first diffraction order and the diffracted light form the signal beam propagating along the normal to the diffraction grating is the positive first diffraction order. A lens L1 collects the diffracted light and focuses the light onto a one-dimensional CCD detector 38 placed at the conjugate image plane of grating G. CCD array 38 includes an input shutter (not shown) to allow the diffraction orders from only one pulse to pass through. The output of CCD detector 38 is fed into a computer 39 where the output from CCD 38 is processed.

For the sake of convenience, the term "rotating imager" refers to any rotating imaging device, regardless if it is based on acoustic, light, magnetic, x-ray, or other energy.

Figure 5:
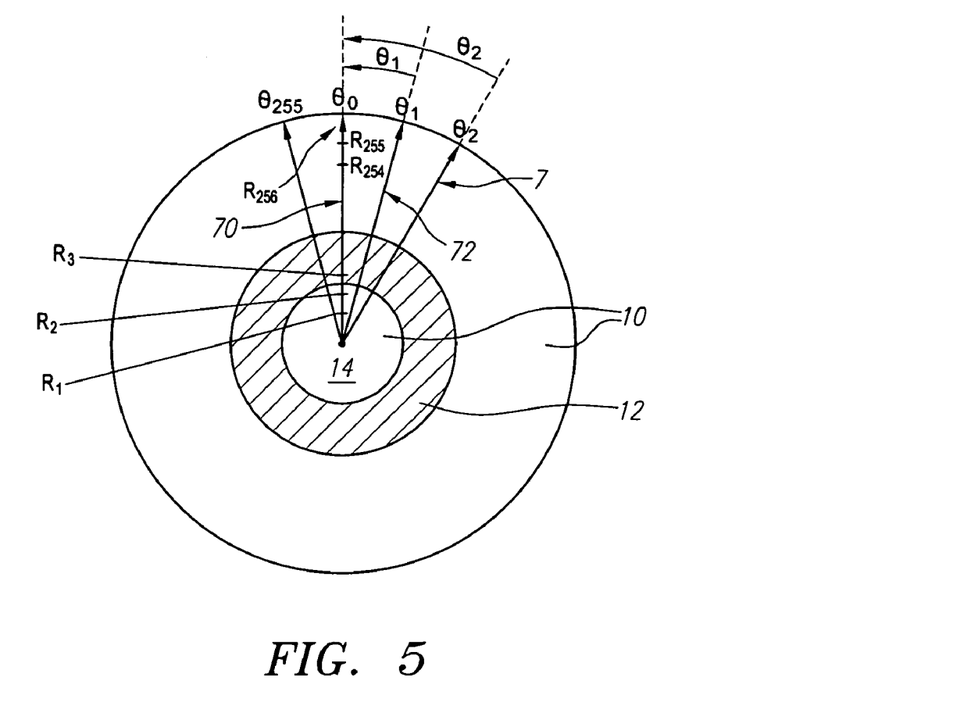
FIG. 5 is a representation of an example view of the stent and the blood vessel of FIG. 2, with rays having radii and angles.

FIG. 5 is a representation of an example view of the stent and the blood vessel of FIG. 2, which representation illustrates the radii $R_i$ and angles $\theta_i$ (theta) used by the medical instrument to capture rotating snapshot images of the view. Emanating from the centerpoint 14 of the view is a first ray 70. The first ray 70 is a vector extending away from the centerpoint 14. The first ray 70 is presumed to have an angle $\theta_0$ of 0 degrees because the first ray is considered to be the basis from which the angles of the other rays are calculated. By having an angle $\theta$ of zero, the rotating imager is at its initial position (e.g., not rotated). Preferably, the rotating imager takes images in slices at increasing radii $R_i$ away from the centerpoint 14. Thus, if there are 256 radii along the first ray 70, the rotating imager takes an image at a radius of 1 unit away (e.g., $R_1$) from the centerpoint 14, an image at a radius of 2 units away (e.g., $R_2$) from the centerpoint 14, an image at a radius of 3 units away (e.g., $R_3$) from the centerpoint 14, and so on, until an image at a radius of 256 units away (e.g., $R_{256}$) from the centerpoint 14. Of course, the number of radial snapshots can be increased or decreased from 256 as desired. Then the rotating imager rotates by an angle $\theta_1$ of one angular unit to the second ray 72. The second ray 72 is offset from the first ray 70 at an angle $\theta_1$ of one angular unit, preferably in degrees. For example, if there are 256 rays radiating out from the centerpoint 14, each ray would be separated from immediately adjacent rays by about 1.4 degrees. For the second ray 72, again assuming there are 256 radii per ray, the rotating imager would take an image at a radius of 1 unit away (e.g. $\theta_1$) from the centerpoint 14, an image at a radius of 2 units away (e.g. $\theta_2$) from the centerpoint 14, an image at a radius of 3 units away (e.g. $\theta_3$) from the centerpoint 14, and so on, until an image at a radius of 255 units away (e.g. $\theta_{255}$) from the centerpoint 14. This rotating imaging process continues for each ray and each radii of each ray. The angle $\theta$ for each ray is made preferably relative to the first ray. Hence, if there are 256 equally spaced rays, the second ray 72 would have $\theta$ of 1.4 degrees and the third ray 76 would have $\theta$ of 2.8 degrees. Of course as with the radii, the number of angles can be increased or decreased from 256 as desired.

Figure 6:
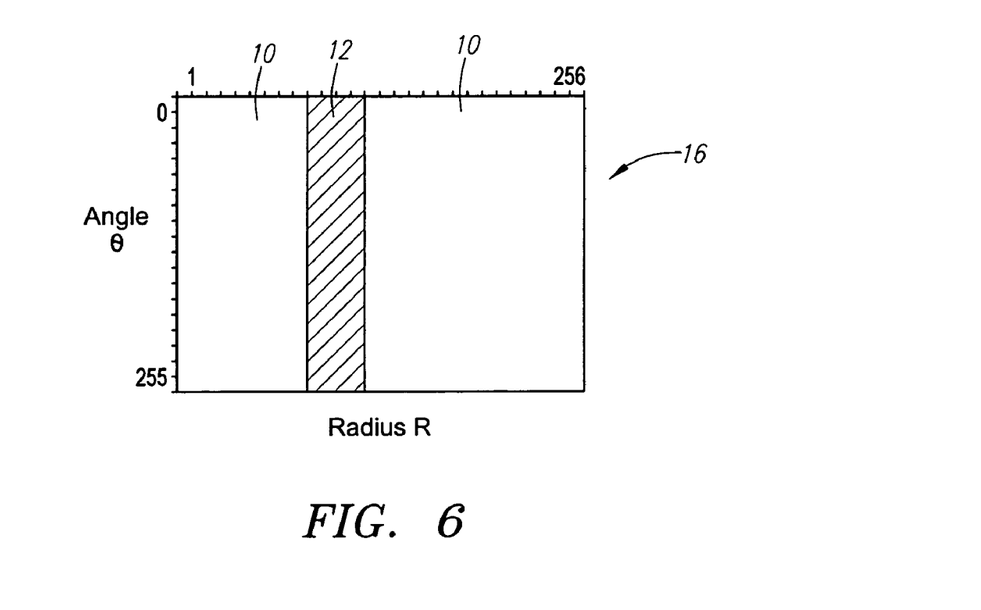
FIG. 6 is a representation of an example view of the stent and the blood vessel of FIG. 2 as viewed on a polar coordinate system.

The resulting snapshots are in a R-$\theta$ or polar format, which refers to the taking of snapshots at each radius R of each ray. Without being drawn to scale, FIG. 6 is a representation of an example view of the stent 12 and the blood vessel 10 of FIG. 2 as viewed on a polar coordinate system. Because of the polar coordinate system, the circular stent 12 appears as a rectangular, instead of a cylindrical, object in the polar format 16. Accordingly, human users cannot readily discern objects in a polar coordinate system. When objects of more complex shapes are viewed in polar format, the resulting shapes are quite different than their real-life forms. Therefore, it would be desirable for the polar format of images be converted or transformed into images that the human eye can recognize. However, the prior art, such as the Galaxy System sold by Boston Scientific Corporation and FIG. 1, used expensive, complex electronic circuitry to perform this transformation.

Figure 7A:
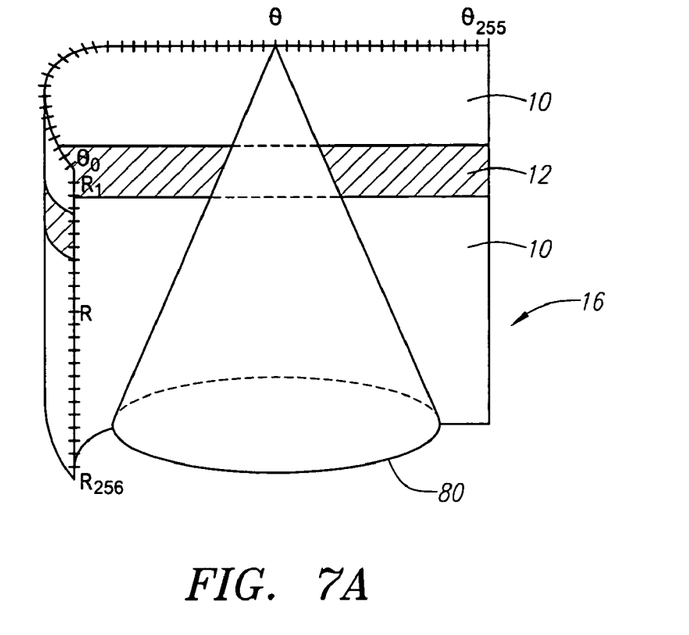
FIGS. 7A and 7B are representations of the stent and the blood vessel of FIG. 5 during the process of wrapping the polar format around a cone.
Figure 7B:
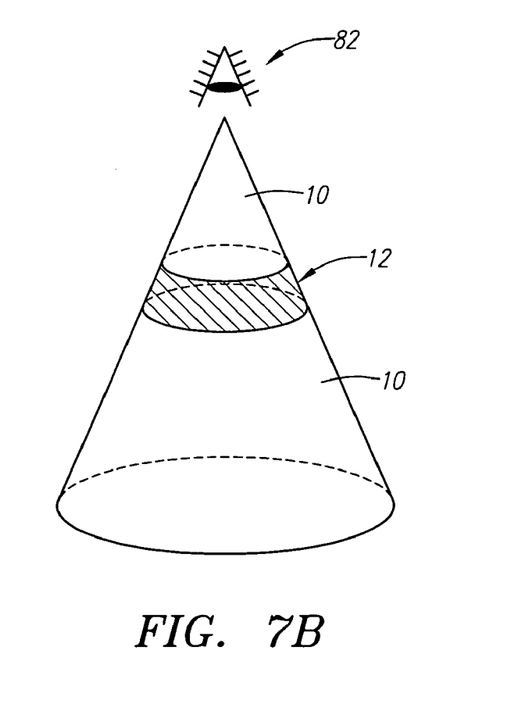

The improved scan conversion method, however, simplifies the transformation tremendously. In the first example embodiment of this improved method, the R-$\theta$ imaging data, or polar format 16, is "texturized" or wrapped around an object, which is preferably a cone, as illustrated in FIGS. 7A and 7B. FIGS. 7A and 7B are representations of the stent 12 and the blood vessel 10 of FIG. 5 during the process of wrapping the polar format 16 around a cone 80. The polar format 16 is preferably rotated 90 degrees and wrapped around the cone 80, as illustrated in FIG. 6. Alternatively, the polar format 80 is wrapped around a cone 16 whose orientation is 90 degrees from the cone illustrated in FIG. 6. Either way, the polar format 16 is wrapped preferably around the cone 80 to form a textured or wrapped cone, as illustrated in FIG. 7B.

Figure 7C:
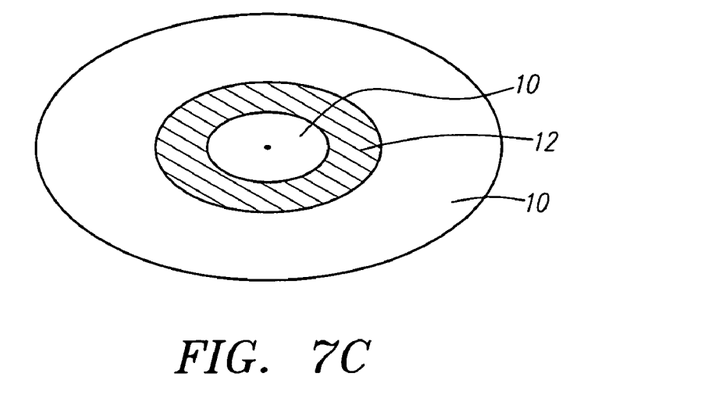
FIG. 7C is a representation of the stent and the blood vessel of FIG. 5 after the polar format is wrapped around a cone and the height of the cone is zero.
Figure 8:
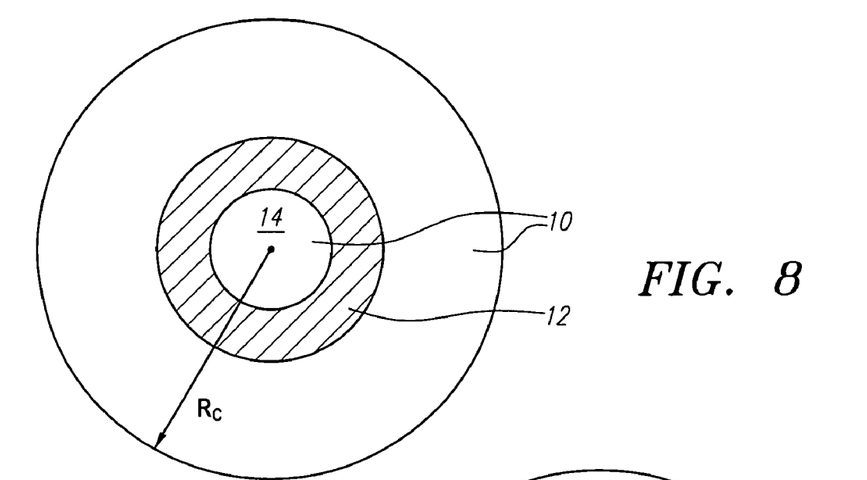
FIG. 8 is a representation of the stent and the blood vessel of FIG. 5 after the polar format is wrapped around a cone and the height of the cone is zero, as the human eye in FIG. 7B would see them.

In the first embodiment of the improved scan conversion method, the height of the cone 80 is reduced to zero. The result is a cartesian view of the R-□ data, as shown in FIG. 7C, that equivalently is FIG. 8 which illustrates what the human eye 82 in FIG. 7B would see. FIG. 8 is a representation of the stent 12 and the blood vessel 10 of FIG. 5 after the polar format 16 is wrapped around the cone 80 and the height of the cone 80 has been reduced to zero, in the form that the human eye in FIG. 7B would see them. This resulting cartesian view is readily recognizable by the human eye 82. Referring to FIG. 7B, when the height of the cone 80 is reduced to zero, the human eye 82 effectively is viewing the cone 80 from its point. What the human eye sees is FIG. 8, which identically or closely resembles FIG. 2.

In a second embodiment of the improved scan conversion method, the R-□ data is texturized around an object, which is preferably a cone, with an initial height of zero. In this alternative embodiment, the texturization step and height reduction step occur simultaneously, rather than sequentially. The end result is FIG. 8.

Figure 10:
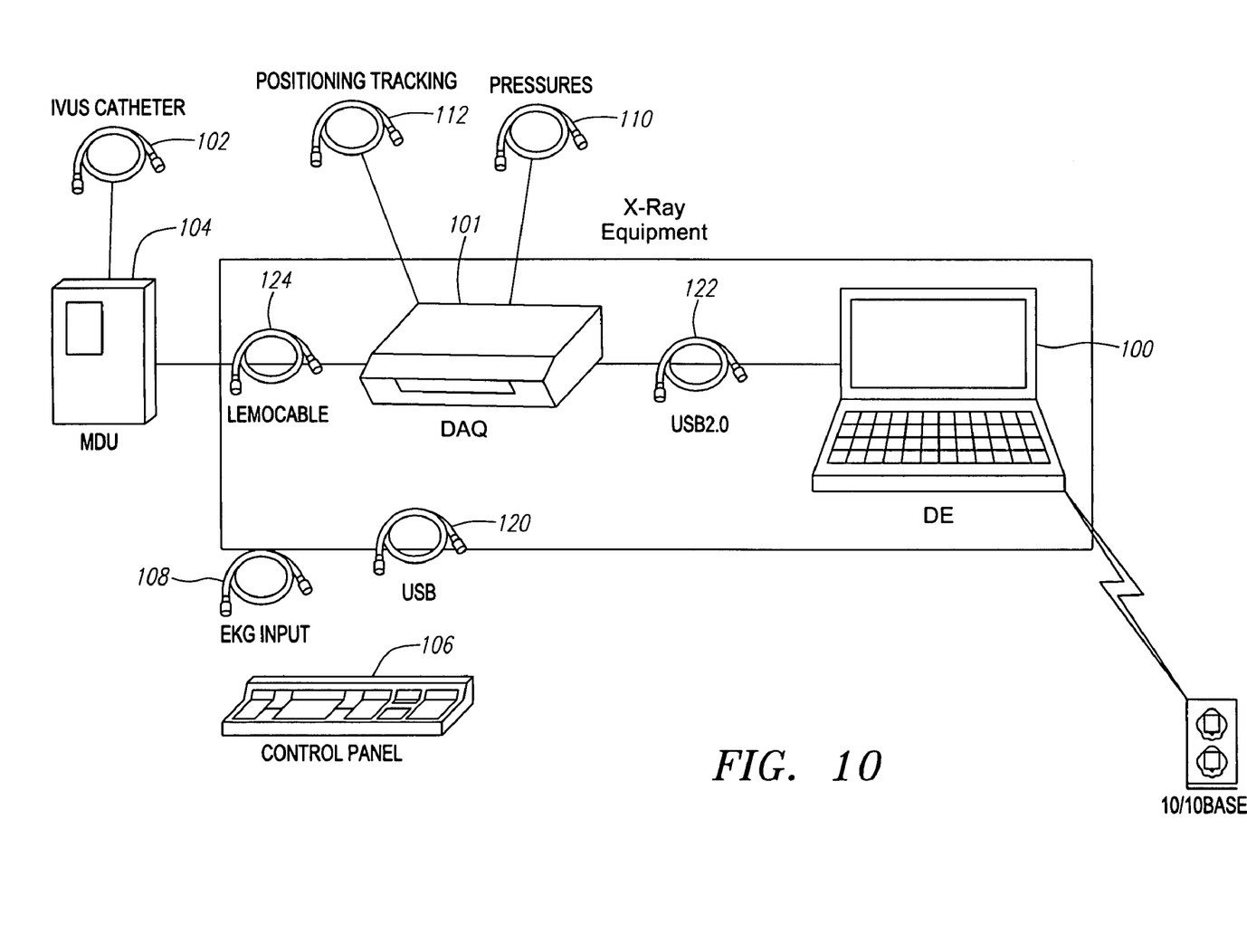
FIG. 10 is a representation of an example embodiment of an improved medical scan conversion system.

FIG. 1 is a representation of a prior art medical imaging system, by Boston Scientific Corporation, the size of which body 5 indicates that it uses a substantial amount of hardware to process and convert imaging data from a polar format to a cartesian format. See, also, U.S. Pat. No. 6,063,032, entitled "Ultrasound Imaging With Zoom Having Independent Processing Channels," issued on May 16, 2000, as an example of a prior art scan conversion system. By contrast, because the preferred embodiment of the improved system wraps the polar imaging data 16 around a cone 80, the improved system can use a commercially available graphics processing unit from Nvidia Corporation and ATI Technologies, Inc. The graphics processing unit is a chipset or electronic circuit card that can fit in a small notebook computer. FIG. 10 illustrates an example embodiment of an improved scan conversion system, including a computer 100 coupled to a data acquisition unit (DAQ) 101 and to a 10/100 Base-T network, an Ethernet network connection standard. If the imaging device is an ultrasound catheter, the DAQ 101 controls the rotation speed of the transducer, ultrasound transmission and decoding of ultrasound echoes. The DAQ 101, in turn, is coupled to a medical imaging instrument 102 such as an intravascular catheter through a motor drive unit (MDU) 104. The MDU 104 preferably contains a motor for rotating the imaging device, transmit and receive circuits to generate an electronic pulse to the imaging device, and amplifier to amplify the return signals. The MDU 104 may also include another motor circuit to control the catheter pull-back for a long-view display. The DAQ 101 may be coupled to other devices such as a keyboard 106, an EKG machine 108, a device 110 for monitoring human body pressure, and/or a positioning/tracking system 112. Various types of data cables may be used, including for example, a Universal Serial Bus (USB) 120, Universal Serial Bus 2.0 (USB2) 122, and a Lemo Cable 124, a custom made cable made by Lemo Co. that is a bundle of different types of wires, such as a 50-ohm coaxial shielded cable, twisted pair, signal wires, etc. The computer 100 of the improved system may use GeForce 2 Ultra, GeForce 3, and GeForce 4 Ti from Nvidia, which are video processors, or the Radeon series of gaming and graphics cards that has ATI's TruForm graphics technology. By programming the improved system to use these graphics processing units, normally intended for video games, the improved system is platform independent, meaning that the scan conversion process should work on a MacIntosh by Apple Computer, an IBM personal computer, or other computing devices, such as various desktop computers, notebook computers and workstations. If handheld computers have sufficient storage and processing power, they may also be used. Also an advantage is that much of the hardware in the prior art (FIG. 1) is no longer needed, which reduces the size of the scan conversion system. The programming language used in connection with the graphics processing units include DirectX from Microsoft Corporation or OpenGL from Silicon Graphics. OpenGL is in the public domain and thus, readily available.

The following example program is written in C++ using Microsoft Corp.'s DirectX interface to control the GPU. Each R-θ data value is texturized. Texture format in an example GPU include the components of Alpha, Red, Green and Blue. Alpha may be assigned to a constant such as 255 (or FF hexadecimal) and Red, Green and Blue may all be assigned to be equal to the R-θ data value. The R-θ data value may be texturized by executing a DirectX function: IDirect3DDevice8::CreateTexture.

Figure 11:
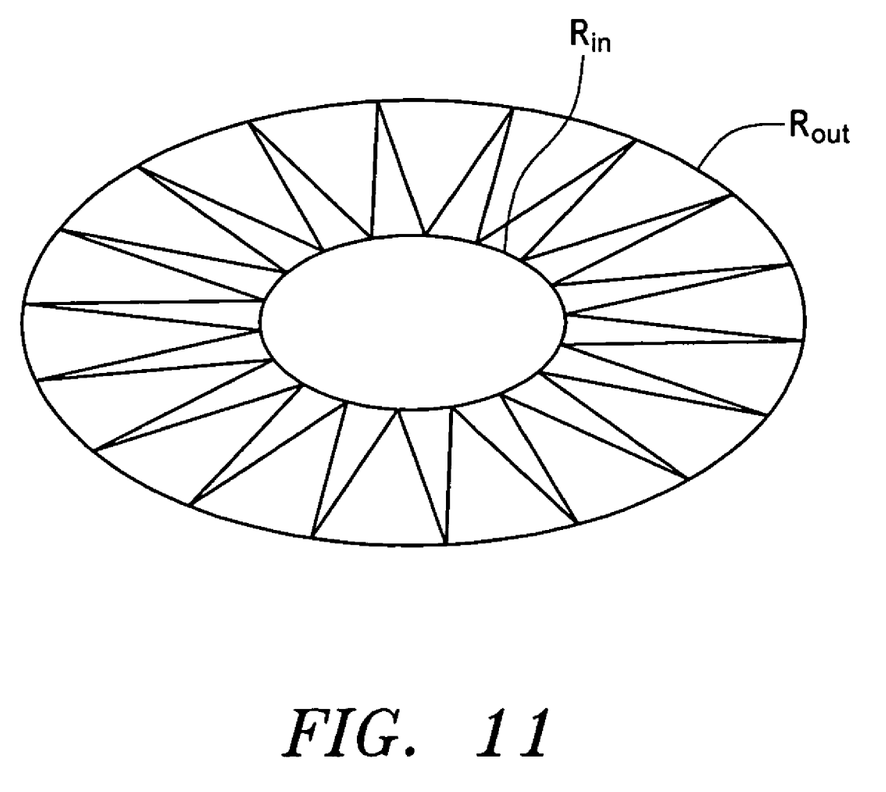
FIG. 11 is an illustration of polygons whose vertices lie on an inner and outer circle.

In DirectX, U-axis and V-axis are used to represent two-dimensional coordinates of texture and have a range between 0 to 1. A R-θ data position along a vector and the vector number (e.g., ray number) of a R-θ frame are mapped into the U-axis and V-axis respectively. Preferably, 512 points are generated along the circumference of the inner circle, which may be spaced equally apart or at 1% of the vector length, and 512 points generated along the circumference of the outer circle, as schematically illustrated in FIG. 11. The coordinates of these 1024 points in three dimensions, referred to as vertices of polygons, are stored in a buffer. In a cone having a height of zero, both Y-coordinates of the inner circle and the outer circle, or the 1024 points, are the same. The following is an example of DirectX software code written in C++ language used to define these 1024 triangular vertices with their Y-coordinates set to zero, and to store these vertices into a buffer pointed to by an address pointer pVertices:

```
long TRI_STRIPS=512;
for(DWORD i=0; i<TRI_STRIPS; i++)
{
FLOAT   theta=(2*D3DX_PI*i)/(TRI_STRIPS-1);//Angle
    From 0 to 2Pi
//Generate Vertices for the Inner Circle with Router=1.0
pVertices[2*i+0].color=0xffffffff; //All ARGB 32-bit On
pVertices[2*i+0].position=D3DXVECTOR3(1.0*sinf
    (theta),0, 0.01*cosf(theta)); //At Y=0,
X=0.01*sinf(theta), Z=0.01*cosf(theta)
pVertices[2*i+0].tu=0.01f; //Last Rtheta of a vector
pVertices[2*i+0].tv=((FLOAT)i)/float(TRI_STRIPS-1);
    //512 points along the circumference of inner circle
//Generate Vertices for the Inner Circle with Router=1.0
pVertices[2*i+1].color=0xffffffff;; //All ARGB 32-bit On
pVertices[2*i+1].position=D3DXVECTOR3(1.0*sinf
    (theta),0.0, 1.0*cosf(theta));); //At Y=0,
X=1.0*sinf(theta), Z=1.0*cosf(theta)
pVertices[2*i+1].tu=1.0f; //Last Rtheta of a vector
pVertices[2*i+1].tv=((FLOAT)i)/float(TRI_STRIPS-1);
    //512 points along the circumference of outer circle
}
```

By connecting these 1024 points in a zigzag pattern as illustrated in FIG. 11, 1022 triangles (i.e., 2*(512-1)) are generated, which are used to construct a cone with a height of zero. An example of DirectX software code written in C++ language used to generate and draw these 1022 triangles around the cone is: DrawPrimitive (D2DPT_TRIANGSLESTIP,0,2*TRIP_STRIPS-2).

Figure 9:
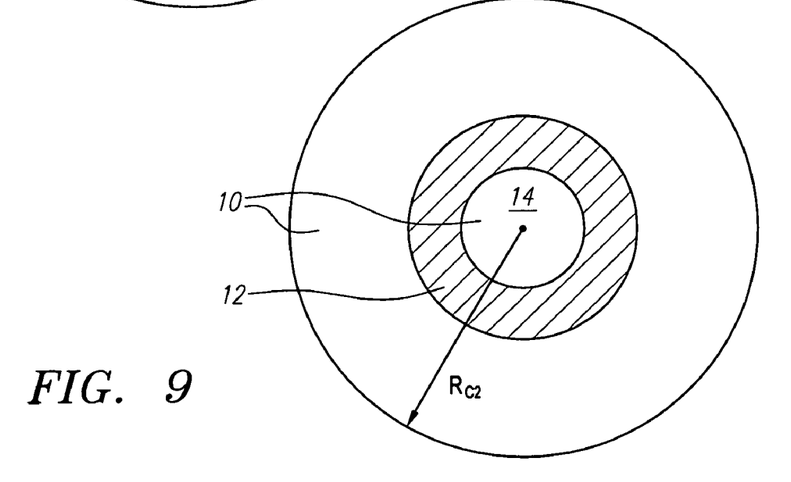
FIG. 9 is a representation of the stent and the blood vessel of FIG. 8 when the radius of the cone is reduced.

By changing the radius of the cone, one can zoom in or out of the image. FIG. 9 is a representation of the stent 12 and the blood vessel 10 of FIG. 8 when the radius Rc of the cone 80 is reduced. The improved method may control the graphics processing unit to determine the radius of the cone, the height of the cone, the position of the human eye relative to the cone, and other attributes.

Preferably, the improved scan conversion method is independent of the type of energy used to image the body, meaning that the method works with imaging data from any kind of medical imaging device, including but not limited to acoustic, light, magnetic and x-ray imaging devices. Acoustic imaging devices include ultrasound imagers. Light imaging devices include optical coherence tomography devices. Magnetic imaging devices include MRIs. Certainly, other kinds of imaging technologies may be used to produce the R-θ imaging data because the improved scan conversion will work for many types of imaging devices.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions described herein is merely illustrative, and the invention can be performed using different or additional process actions, or a different combination or ordering of process actions. As another example, each feature of one embodiment can be mixed and matched with other features shown in other embodiments. Features and processes known to those of ordinary skill in the art of scan conversion of medical images may similarly be incorporated as desired. Additionally and obviously, features may be added or subtracted as desired. Accordingly, the invention is not to be restricted except in light of the attached claims and their equivalents.

What is claimed is:

1. A method for converting imaging data in polar format from a medical imaging device to Cartesian format, the method comprising:
    providing a medical imaging device configured and arranged for insertion of a probe of the medical imaging device into a patient;
    generating imaging data in polar format by the medical imaging device, wherein the generated polar imaging data comprises a single distance $R_i$ and a single angle θ, for each of at least one physical object from a centerpoint of the imaging data; and converting the generated polar imaging data into Cartesian format, wherein the conversion of the polar imaging data into Cartesian format, being performed on a computer, comprises
    wrapping the polar imaging data around a cone; and
    reducing the height of the cone to zero.

2. The method of claim 1 further comprising performing the wrapping step before performing the reducing step.

3. The method of claim 1 wherein the medical imaging device uses acoustic energy to obtain the imaging data.

4. The method of claim 3 wherein the medical imaging device includes an ultrasound imaging device.

5. The method of claim 1 wherein the medical imaging device uses light energy to obtain the imaging data.

6. The method of claim 5 wherein the medical imaging device includes an optical imaging device.

7. The method of claim 6 wherein the optical imaging device uses optical coherence tomography to process the imaging data.

8. The method of claim 1 wherein the medical imaging device uses magnetic energy to obtain the imaging data.

9. The method of claim 8 wherein the medical imaging device includes a magnetic resonance imaging device.

10. The method of claim 1 wherein the medical imaging device uses x-ray energy to obtain the imaging data.

11. A method for converting imaging data in polar format from a medical imaging device to Cartesian format, the method comprising:
   providing a medical imaging device configured and arranged for insertion of a probe of the medical imaging device into a patient;
   generating imaging data in polar format by the medical imaging device, wherein the generated polar imaging data comprises a single distance $R_i$ and a single angle $\theta_i$ for each of at least one physical object from a centerpoint of the imaging data; and
   converting the generated polar imaging data into Cartesian format, wherein the conversion of the polar imaging data into Cartesian format, being performed on a computer, comprises wrapping the polar imaging data around a cone, wherein the cone is defined by an inner circle, an outer circle, and a zigzag pattern of lines forming a plurality of triangles of alternating directions connecting points on the inner circle to points on the outer circle.

12. The method of claim 11 wherein the medical imaging device uses acoustic energy to obtain the imaging data.

13. The method of claim 11 wherein the medical imaging device uses light energy to obtain the imaging data.

14. The method of claim 11 wherein the medical imaging device uses magnetic energy to obtain the imaging data.

15. The method of claim 11 wherein the medical imaging device uses x-ray energy to obtain the imaging data.

16. The method of claim 1, further comprising rotating the polar imaging data ninety degrees prior to wrapping the polar imaging data around the cone.

17. The method of claim 1, wherein the medical imaging device comprises at least one imager.

18. The method of claim 17, wherein the at least one imager is rotatable.

19. The method of claim 17, wherein the at least one imager comprises a rotating circular array.

20. The method of claim 1, wherein the medical imaging device comprises at least one of a catheter, an endoscope, a laparoscopic device, an arthroscopic device, an angioplasty device, or a surgical device.

* * * * *

UNITED STATES PATENT AND TRADEMARK OFFICE
CERTIFICATE OF CORRECTION

PATENT NO. : 7,620,220 B2  Page 1 of 1
APPLICATION NO. : 10/394480
DATED : November 17, 2009
INVENTOR(S) : Duc Huu Lam It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1775 days.

Signed and Sealed this

Twenty-sixth Day of October, 2010

David J. Kappos
*Director of the United States Patent and Trademark Office*